United States Patent
Bandela et al.

(10) Patent No.: US 10,419,558 B2
(45) Date of Patent: Sep. 17, 2019

(54) METHODS AND SYSTEMS FOR PROVISIONING A USER PROFILE ON A MEDIA PROCESSOR

(71) Applicant: THE DIRECTV GROUP, INC., El Segundo, CA (US)

(72) Inventors: Sudheer Bandela, Torrance, CA (US); Binny Asarikuniyil, Cerritos, CA (US); Hai Nguyen, Torrance, CA (US); Heather Truong, Anaheim, CA (US)

(73) Assignee: The DIRECTV Group, Inc., El Segundo, CA (US)

(*) Notice: Subject to any disclaimer, the term of this patent is extended or adjusted under 35 U.S.C. 154(b) by 149 days.

(21) Appl. No.: 15/245,704

(22) Filed: Aug. 24, 2016

(65) Prior Publication Data
US 2018/0063263 A1    Mar. 1, 2018

(51) Int. Cl.
*G06F 15/16* (2006.01)
*H04L 29/08* (2006.01)
(Continued)

(52) U.S. Cl.
CPC .......... *H04L 67/22* (2013.01); *H04L 65/1016* (2013.01); *H04L 65/403* (2013.01); *H04L 67/306* (2013.01); *H04N 21/41407* (2013.01); *H04N 21/4223* (2013.01); *H04N 21/44222* (2013.01); *H04N 21/44231* (2013.01); *H04N 21/4532* (2013.01); *H04N 21/4751* (2013.01);
(Continued)

(58) Field of Classification Search
CPC ...... H04L 67/22; H04L 67/306; H04W 8/005; H04N 21/43615; H04N 21/4532; H04N 21/4668

USPC .......................................................... 709/217
See application file for complete search history.

(56) References Cited

U.S. PATENT DOCUMENTS

| 7,134,130 B1 | 11/2006 | Thomas |
| 8,104,066 B2 | 1/2012 | Colsey et al. |
| (Continued) | | |

FOREIGN PATENT DOCUMENTS

EP    2849450 A1    3/2015

OTHER PUBLICATIONS

Bohn, Dieter, "Google reportedly demoed Android set top box with camera and motion sensor in January," The Verge, theverge.com, Jul. 25, 2013.
(Continued)

*Primary Examiner* — Sm A Rahman
(74) *Attorney, Agent, or Firm* — Guntin & Gust, PLC; John G. Rauch

(57) ABSTRACT

Aspects of the subject disclosure may include, for example, detecting a plurality of mobile devices in proximity to a device. Further embodiments can include identifying a user identifier associated with each of the plurality of mobile devices resulting in a plurality of user identifiers. Additional embodiments can include obtaining a user profile associated with each of the plurality of user identifiers resulting in a plurality of user profiles. Also, embodiments can include identifying a first user profile having a first priority among the plurality of user profiles. Further embodiments can include provisioning the first user profile on a media processor or set top box and providing media content for presentation on a display according to the first user profile. Other embodiments are disclosed.

20 Claims, 8 Drawing Sheets

(51) Int. Cl.
  *H04N 21/45* (2011.01)
  *H04L 29/06* (2006.01)
  *H04W 4/02* (2018.01)
  *H04W 4/50* (2018.01)
  *H04N 21/414* (2011.01)
  *H04N 21/4223* (2011.01)
  *H04N 21/442* (2011.01)
  *H04N 21/475* (2011.01)
  *H04N 21/436* (2011.01)
  *H04N 21/466* (2011.01)

(52) U.S. Cl.
  CPC ............. *H04W 4/023* (2013.01); *H04W 4/50* (2018.02); *H04N 21/43615* (2013.01); *H04N 21/4668* (2013.01)

(56) References Cited

U.S. PATENT DOCUMENTS

| | | | |
|---|---|---|---|
| 8,269,834 B2 | 9/2012 | Albertson et al. | |
| 8,299,928 B2 | 10/2012 | Kennedy et al. | |
| 8,539,357 B2 | 9/2013 | Hildreth et al. | |
| 8,561,095 B2 | 10/2013 | Dimitrova et al. | |
| 8,849,199 B2 | 9/2014 | Shrum, Jr. et al. | |
| 8,924,999 B1* | 12/2014 | Santangelo | H04N 21/25875 725/10 |
| 8,949,871 B2 | 2/2015 | Chai et al. | |
| 9,055,337 B2 | 6/2015 | Elliott et al. | |
| 9,100,694 B1 | 8/2015 | Chandel et al. | |
| 9,137,558 B2 | 9/2015 | Gibbon et al. | |
| 9,204,376 B2 | 12/2015 | Ullah | |
| 9,241,200 B2 | 1/2016 | Chen | |
| 2002/0194586 A1 | 12/2002 | Gutta et al. | |
| 2004/0193609 A1* | 9/2004 | Phan | H04L 12/2803 |
| 2008/0147772 A1* | 6/2008 | Runne | H04L 67/306 709/201 |
| 2009/0138805 A1* | 5/2009 | Hildreth | G06K 9/00335 715/745 |
| 2009/0217324 A1 | 8/2009 | Massimi et al. | |
| 2010/0070995 A1 | 3/2010 | Pan et al. | |
| 2011/0072452 A1 | 3/2011 | Shimy et al. | |
| 2011/0107379 A1* | 5/2011 | Lajoie | H04L 65/1016 725/87 |
| 2011/0136442 A1 | 6/2011 | Beals et al. | |
| 2011/0138408 A1* | 6/2011 | Adimatyam | H04H 60/372 725/14 |
| 2012/0112877 A1 | 5/2012 | Gravino et al. | |
| 2012/0159327 A1 | 6/2012 | Law et al. | |
| 2014/0152899 A1 | 6/2014 | Newell et al. | |
| 2014/0233461 A1 | 8/2014 | Jagger et al. | |
| 2014/0250447 A1 | 9/2014 | Schink et al. | |
| 2015/0040198 A1 | 2/2015 | Gopalakrishnan et al. | |
| 2015/0370818 A1 | 12/2015 | Des Jardins et al. | |

OTHER PUBLICATIONS

Harte, Lawrence, "Automatic TV Viewer Identification" IPTV Magazine, iptvmagazine.com, May 31, 2009.
Levine, Barry, "Lotame's new Smart TV Audiences adds your TV shows to your device and online profile," Marketing Land, marketingland.com, Mar. 28, 2016.

* cited by examiner

METHODS AND SYSTEMS FOR PROVISIONING A USER PROFILE ON A MEDIA PROCESSOR

FIELD OF THE DISCLOSURE

The subject disclosure relates to a methods and system for provisioning a user profile on a media processor.

BACKGROUND

Modern media content providers can use a media processor or set top box on a premises to provide media content to their subscribers or users. Further, a premises can have multiple users viewing media content provided by the media processor to a display. In addition, each user can have a user profile listing past viewing choices for media content, favorite media content, and recommended media content for viewing. Portions of such information can be presented to a user in Electronic Programming Guide (EPG) on the display.

BRIEF DESCRIPTION OF THE DRAWINGS

Reference will now be made to the accompanying drawings, which are not necessarily drawn to scale, and wherein.

DETAILED DESCRIPTION

Figure 1:
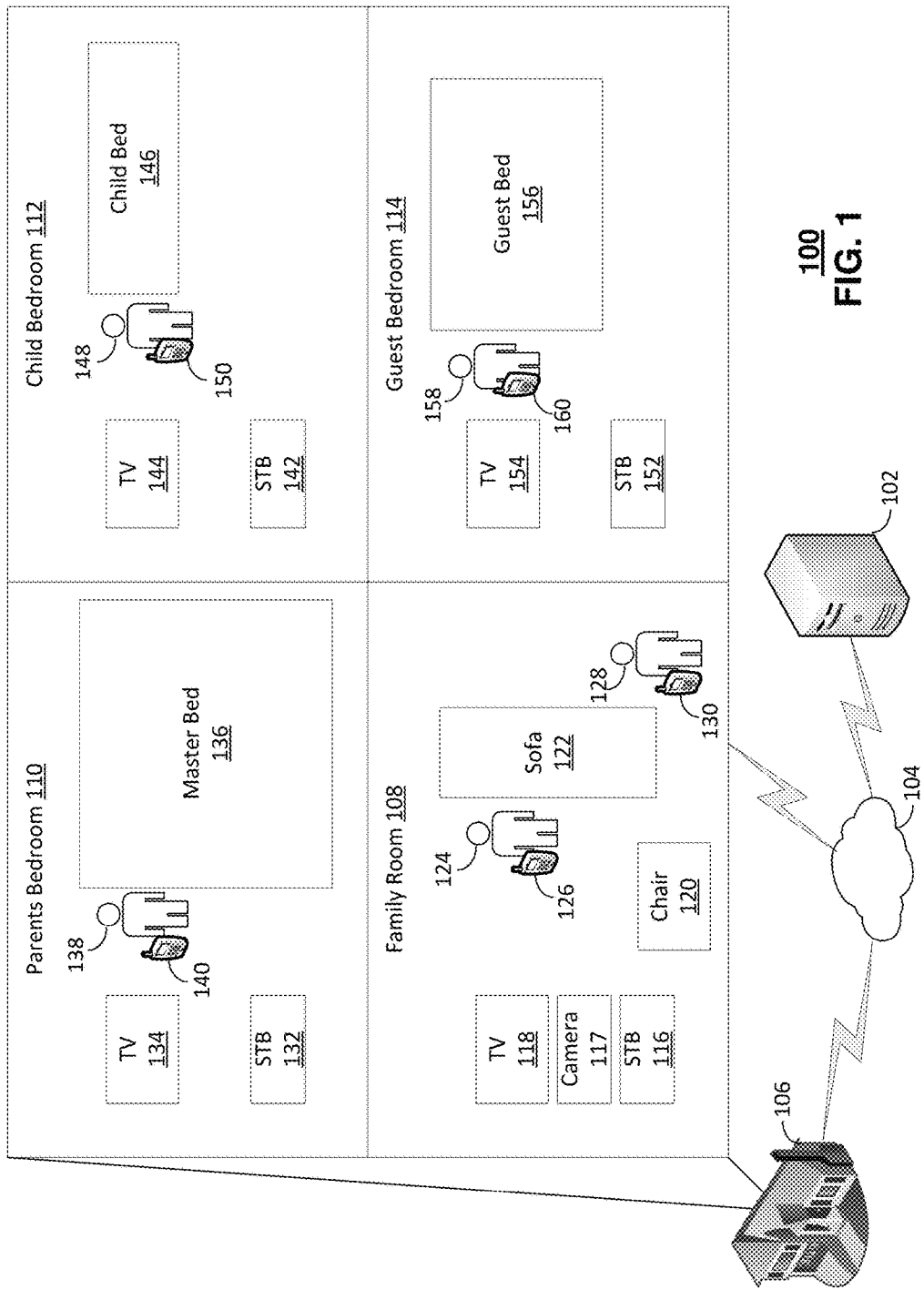
FIGS. 1-2 depicts an illustrative embodiment of a system for provisioning a user profile on a media processor.

The subject disclosure describes, among other things, illustrative embodiments for provisioning a user profile on a media processor or set top box. Embodiments include detecting a plurality of mobile devices in proximity to the set top box. Further embodiments can include identifying a user identifier associated with each of the plurality of mobile devices resulting in a plurality of user identifiers. Additional embodiments can include obtaining a user profile associated with each of the plurality of user identifiers resulting in a plurality of user profiles. Also, embodiments can include identifying a first user profile having a first priority among the plurality of user profiles. Further embodiments can include provisioning the first user profile on a media processor or set top box and providing media content for presentation on a display according to the first user profile. Other embodiments are described in the subject disclosure.

One or more aspects of the subject disclosure include a device, comprising a processing system including a processor and a memory that stores executable instructions that, when executed by the processing system, facilitate performance of operations. The device can be a media processor or network device. The operations can include detecting multiple mobile devices in proximity to the device. Further, the operations can include identifying a user identifier associated with each of the multiple mobile devices resulting in multiple user identifiers. Additionally, the operations can include obtaining a user profile associated with each of the multiple user identifiers resulting in multiple user profiles. Also, the operations can include identifying a first user profile having a first priority among the multiple user profiles. The operations can include provisioning the first user profile on the device and providing media content for presentation on a display, communicatively coupled to the device, according to the first user profile.

One or more aspects of the subject disclosure include a machine-readable storage medium, comprising executable instructions that, when executed by a processing system (such as a media processor or network device) including a processor, facilitate performance of operations. The operations can include detecting multiple mobile devices in proximity to the processing system. Further operations can include capturing an image of a viewing area for a display, communicatively coupled to the processing system and identifying multiple users within the viewing area. Additional operations can include identifying a user identifier associated with each of the multiple users within the viewing area resulting in multiple user identifiers. Also, operations can include obtaining a user profile associated with each of the multiple user identifiers resulting in multiple user profiles. The operations can include identifying a first user profile having a first priority among the multiple user profiles. Further operations can include provisioning the first user profile on the processing system and providing media content for presentation on the display according to the first user profile.

One or more aspects of the subject disclosure include a method. The method can include detecting, by a processing system (e.g. media processor or network device) including a processor, multiple mobile devices in proximity to the processing system. Further, the method can include identifying, by the processing system, a user identifier associated with each of the multiple mobile devices resulting in multiple user identifiers. In addition, the method can include obtaining, by the processing system, a user profile associated with each of the multiple user identifiers resulting in multiple user profiles. Also, the method can include identifying, by the processing system, a first user profile having a first priority among the multiple user profiles. The method can include identifying, by the processing system, an account associated with the first user profile. Further, the method can include provisioning, by the processing system, the first user profile on the processing system. Additionally, the method can include identifying, by the processing system, a master user profile associated with the account and determining, by the processing system, that the first user profile is not the master user profile. Also, the method can include identifying, by the processing system, a plurality of control settings associated with the master user profile to be used when providing media content associated with the first user profile and providing, by the processing system, media content to be presented on a display according to the first user profile and the plurality of control settings.

FIG. 1 depicts an illustrative embodiment of a system 100 for provisioning a user profile on a media processor. In one or more embodiments, the system 100 includes a media processor, or set top box (STB) 116, 132, 142, 152 in each of four rooms, a family room 108, a parents bedroom 110, a child bedroom 112, and a guest bedroom 114 in a residential premises 106 (e.g. single family house). Each set top box 116, 132, 142, 152 can be communicatively coupled to a display such as a television 118, 134, 144, 154. Further, each room may have a viewing area. The viewing area for each room can include furniture for viewers to comfortably view media content provided by the set top box 116, 132, 142, 152 for presentation on television 118, 134, 144, 154. In the family room 108, a chair 120 and sofa 122 can be within the viewing area. Further, in the parents bedroom 110, the parents bed 136 can be within the viewing area. In addition, in the child bedroom 112, the child bed 146 can be within the viewing area. Also, in the guest bedroom 114, the guest bed 156 can within the viewing area.

In one or more embodiments, the system 100 allows for a set top box 116, 132, 142, 152 to detect a mobile device 126, 130, 140, 150, 160 when it is in proximity to the set top box 116, 132, 142, 152. A parent (e.g. father) 138 can be in the parents bedroom 110. The set top box 132 can detect that the parent's mobile device 140 is in proximity to the set top box 132. In some embodiments, the set top box 132 can detect the mobile device 140 using a peer to peer communication link such as Bluetooth® technology. The set top box 132 can receive a signal from the mobile device 140 across such the communication link. Further, the set top box can detect the strength of the signal (e.g. power, energy, etc.) and determine an approximate distance the mobile device 140 is from the set top box 132. If the signal strength is within a predetermined threshold which may correspond to a certain distance the mobile device 140 is from the set top box 132, then the set top box 132 determines that the mobile device 140 is in proximity to the set top box 132.

In other embodiments, a mobile application can be running on the mobile device 140 that periodically provides location information of the mobile device 140 to a media content management server 102 over a communication network 104. The communication network 104 can be a wireless network such as a WiFi network or a cellular network, a landline network, or a combination thereof. The media content management server 102 receives the location information for the mobile device 140. In one or more embodiments, the media content management server 102 can forward the location information to the set top box 132 for processing or process the location information itself. In some embodiments, the mobile device 140 can provide the location information to the set top box 132 over the peer-to-peer communication link or a communication network within the residential premises 106. The set top box 132 or media content management server 102 can compare the location information of the mobile device 140 with the stationary location of the set top box 132 and determine whether the mobile device 140 is in proximity to the set top box 132.

In response to detecting the mobile device 140 is in proximity with the set top box 132, the location identifies a user identifier associated with the mobile device 140. In some embodiments, when a peer-to-peer communication link is used to detect the mobile device 140, a signal provided by the mobile device 140 can include a user identifier for user 138. In further embodiments, the signal can provide a device identifier for mobile device 140. If the mobile device was registered with system 100 a priori, then the set top box 132 can send the device identifier to media content management server 102. In other embodiments, the mobile device 140 can provide device identifier or a user identifier for user 138 over communication network 104 to media content management server 102. Whether the device identifier is provided via the set top box 132 or by the mobile device 140 over the communication network, the media content management server 102 can access the user identifier according to the device identifier. During a prior registration process of the mobile device 140 with system 100, the media content management server 102 associated the device identifier of mobile device 140 with a user identifier. The device identifier can include alphanumeric, graphical, text, or any other type of information to identify mobile device 140. The user identifier can include alphanumeric, graphical, text, or any other type of information to identify user 138 (e.g. name). The media content management server 102 can provide the user identifier across the communication network 104 to set top box 132.

In one or more embodiments, the set top box 132 can obtain a user profile associated with the user identifier. In some embodiments, the set top box can store user profiles associated with members of the household for residential premises 106 in its own storage device and access one of them, accordingly. In other embodiments, the set top box 132 can provide the user identifier to the media content management server 102 over communication network 104 along with a request for the user profile associated with the user identifier. In further embodiments, the media content management server 102 may have provided the user identifier to the set top box and had previously stored or has access to the user identify such that set top box 132 sends only the request for the user profile associated with the user identifier. The media content management server 102 accesses the user profile associated with the user identifier and provides the user profile to the set top box 132. In additional embodiments, the user profile can be stored in the mobile device 140. Responsive to being detected by the set top box 132, the mobile device 140 may transmit the user profile to the set top box 132 using the peer-to-peer communication link, a communication network within residential premises 106 or send the user profile to the set top box 132 via media content management server 102 and/or communication network 104.

In one or more embodiments, responsive to obtaining the user profile, the set top box 132 provisions or otherwise loads the user profile onto itself. A user profile can include past viewing choices of media content, favorite media content programs, and recommended media content programs based on past viewing choices and favorite media content programs as well currently subscribed service packages and recommend service packages, or any combination thereof. Further, the user profile can include a schedule of upcoming media content programs that were viewed in the past, favorites, or recommended. Such information associated with the user profile can be presented to the television 134 in response to the user profile being provisioned on set top box 132. The information can be presented in an electronic programming guide (EPG). In some embodiments, the set top box 132 can provide media content for presentation on the television according to the user profile. The media content could be a media content program the user 138 has configured in the user profile to be presented in response to the user profile provisioned on the set top box 132. In other embodiments, the user 138 can use the mobile application running on the mobile device 140 or a remote control device for either the set top box 132 or television 134 to select a media content program on the electronic programming guide to be presented on the television 134.

In one or more embodiments, in the child bedroom 112, a child 148 with mobile device 150 can be in proximity with the set top box 142. As described herein, the set top box detects the mobile device 150 and obtains a user profile associated with the user 148. The user profile can be provisioned onto set top box 142. Further, the set top box 142 can identify an account associated with the user profile. In some embodiments, the set top box 142 can access account information for each user profile associated with the members of household in the residential premises 106 from its own storage device including a master profile associated with the account. In other embodiments, the set top box 142 can request the media content management server 102 for the account information associated with user profile. This request can include providing the user profile to the media content management server 102. In response to identifying the account associated with the user profile, the set top box or media management server can identify a master user profile of the account. A master user profile is associated with a head of household or an account holder. Further, each member of the household has a user profile. In addition, each user profile has a priority. It has highest priority over the other user profiles associated with household members of the residential premises 106. In further embodiments, the master user profile can associate control settings or parental controls with certain user profiles. For example, a master user profile that is a parent user profile can associate control settings with the child user profile. Such control settings can be configured onto the set top box 142. In addition, when the child user profile is provisioned on the set top box 142, the set top box 142 provides media content to be presented on television 144 according to the child user profile for user 148 and the control settings. This prevents the user 148 from viewing age-inappropriate media content.

In one or more embodiments, in the family room 108 there are two users 124, 138, each with a mobile device 126, 130. The set top box 116 can detect the mobile devices 126, 130 and obtain a user profile associated with each user 124, 128, as described herein. Further, the set top box identifies the user profile with the first or highest priority among the two user profiles associated with user 124, 128. For example, user 128 may be a parent and user 124 may be a child. The user profile associated with the user 128 may have a higher priority than the user profile associated with user 124. In addition, the set top box 116 provisions or otherwise loads the user profile having the first or higher priority onto itself. After the user profile with the first priority is provisioned, the set top box 116 can provide media content for presentation on the television 118 according to the user profile having the first priority.

In one or more embodiments, the set top box 116 can detect multiple mobile devices in its proximity. This can include not only mobile devices 126, 130 in the family room but also the mobile device 140 in the parents bedroom located above the family room. The user 138 associated with the mobile device 140 in the parents bedroom is not able to view television 118 communicative coupled to set top box 116 because user 138 is not within the viewing area for television 118. To prevent obtaining the user profile for user 138, thereby wasting time and resources as well as loading user profile for a user not viewing television 118, the set top box 116 captures an image of the viewing are of television 118 using a camera 118. Camera 118 is communicatively coupled to set top box 116 and can be mounted on or integrated with television 118 or set top box 116. Further, the set top box 116 identifies the users 124, 128 in the viewing area (and not user 138). This can be done by the set top box 116 accessing stored digital images of the users 124, 128 either from its own storage device or from the media content management server 102. These digital images can be provided when registering mobile devices 126, 130, 140, 150, 160 with system 100. In addition, the set top box 116 can implement image recognition techniques to compare the captured images with the stored digital images of the users 124, 128. The image recognition techniques can determine a match between the images of the people in the captured images and the stored digital images of the users 124, 128. In other embodiments, the set top box 116 can send the captured images to media content management server 102 for image processing. The media content management server 102 can access stored digital images of the users 124, 128 and determine a match between the images of the people in the captured images and the stored digital images of the users 124, 128.

Further, a user identifier may be associated with the stored digital images of the user 124, 128. Thus, in response to identifying users within the viewing area, the set top box 116 (or media content management server 102) can identify the user identifier for each user 124, 128 in the viewing area. Further, the set top box 116 (or media content management server 102) can obtain a user profile associated with each of the user identifiers. Such user profiles can be considered viewing user profiles. In addition, set top box 116 can determine a user profile having a first priority or highest profile among the viewing user profiles. For example, the viewing profiles can include the user profile for parent user 128 and the user profile for child user 124. The user profile for parent user 128 may have a first priority or higher priority than child user 124. Thus, the user profile for parent user 128 is provisioned on set top box 116.

In one or more embodiments, in the guest room 114, a user 158 may be a guest in residential premises 106. The set top box 152 can be operated by a media content provider. Further, the user 158 may not a member of the household of residential premises 106 and therefore does not have user profile associated with the account for residential premises 106. However, the user 158 can be a subscriber for the same media content provider that operates set top box 152. Thus, the user 158 can have a user profile that is associated with its own account separate from the account associated with the residential premises 106. In addition, the user associated with the master profile for the account associated with residential premises 106 can configure set top box 152 to be able to provision or load a user profile not associated with the account for the residential premises 106. In some embodiments, responsive to detecting the mobile device 160, identifying the user identifier associated with user 158, and obtaining the user profile for user 158, as described herein, the set top box 152 can provision and load the user profile on itself.

In one or more embodiments, one or more user profiles associated with an account can be used to track viewed media content programs by the media content provider. Tracking viewed programs includes associating previously viewed media content programs with corresponding, currently subscribed service packages. At a later time, when a subscriber/account holder (i.e. user associated with the master user profile) of the media content service indicates removal of a service package while interacting with the media content management server 102 via a user interface, media content management server 102 can provide a message to the user interface indicating that amount of programming that was viewed on the service package to discourage the subscriber to remove the service package. In another embodiment, the media content management server 102 can determine a portion of the favorite or recommended media content programs for a user are from an unsubscribed service package and sends promotional materials for the unsubscribed service package to the user via the user interface (i.e. the user interface can be part of a mobile application running on a mobile device 126, 130, 140, 150, 160).

In one or more embodiments, each set top box 116, 132, 142, 152 can be configured with a different user profile having a first priority or highest priority among other user profiles associated with the account for residential premises 106. However, there can also be a master profile associated with the account. In some embodiments, control settings for a provisioned first priority, user profile, configured by the master profile, can then be implemented on presented media content for the provisioned, first priority user profile for a set top box. For example, a set top box 142 in the child bedroom 112 can be configured with a child user profile as its first priority, user profile. However, a parent user profile associated with a parent user is the master user profile for the account associated with the set top box 142. Thus, if both the parent user profile and the child user profile are obtained during the same time interval, the child user profile is provisioned onto the set top box 142 because it has the first priority (or higher priority) compared to the parent user profile for the set top box 142 in the child bedroom. However, the parent user profile is the master user profile for the account. Any control settings configured for the child user profile according to the user profile are still implemented on media content provided by the set top box 142 even though the child user profile if the first priority, user profile for the set top box 142.

In one or more embodiments, a user profile can be configured to share a list of media content programs to another user profile, within the same premises or in different premises. This allows the different users (even located in different premises) to coordinate viewing of a media content program at the same time.

The mobile devices 126, 130, 140, 150, 160 can be mobile phones, smart phones, tablet computers, laptop computers, smart watches, wearable devices, or any other portable communication device.

Figure 2:
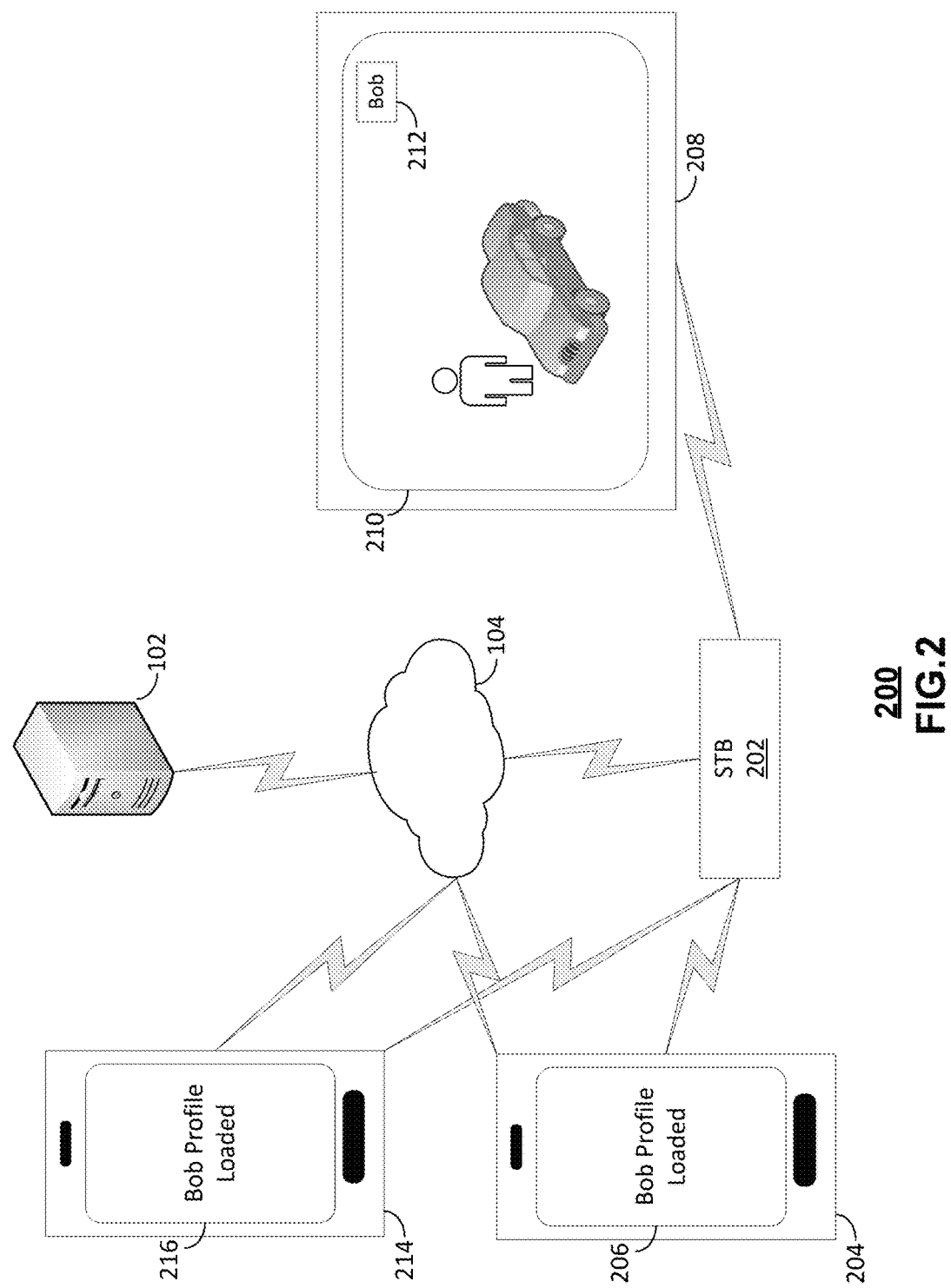

FIG. 2 depicts an illustrative embodiment of 200 for provisioning a user profile on a media processor. In one or more embodiments, a media processor or set top box 202 is communicatively coupled to a display such as television 208. Further, the set top box 202 can detect mobile devices 204, 214.

In some embodiments, a user profile has not been loaded onto set top box 202. As described herein, a set top box 202 can detect the mobile device 204 and obtain the user profile associated with user of mobile device 204. Thereafter, the set top box 202 can provision the user profile on itself and provide media content 210 onto the television 208 according to the user profile. Further, the set top box 202 may place an icon 212 that indicates a user profile has been loaded onto the set top box 202 and indicates the user associated with the user profile (i.e. user name). Also, the set top box 202 can send a notification to the mobile device 204, either through a peer-to-peer communication link or via the communication network 104 and/or media content management server 102. The notification can be presented on the display 206 of mobile device 204 showing the user that their user profile is loaded on the set top box 202.

In other embodiments, a user profile (e.g. Bob user profile) is already loaded onto the set top box 202 and is indicated as such by the icon 212. However, another mobile device 214 is detected by set top box 202. Set top box 202 obtains the user profile associated with the user of mobile device 214, as described herein. Further, the set top box 202 (or media content management server 102) can determine whether the newly obtained user profile has a higher priority than the already loaded user profile. If not, the set top box 202 sends a notification to the mobile device 214 that another user profile has been loaded. The notification can be sent to the mobile device via a peer-to-peer communication link or via the communication network 104 and/or media content management server 102. Further, the notification can be presented on a display 216 of the mobile device 214.

In further embodiments, the set top box 202 can detect two mobile devices 204, 214 within a period of time (e.g. one second) such that the set top box 202 determines the detection of both mobile devices are close enough in time to identify which user profile has a first priority or higher priority and to be provisioned onto set top box 202. As described herein, the set top box 202 obtains a user profile for a user associated with each mobile device 204, 214. Further, the set top box 202 determines which user profile has a first or higher priority among the two user profiles. Thereafter, the set top box 202 provisions itself with the user profile with the first or higher priority and sends a notification to each mobile device 204, 214 of which user profile was provisioned on the set top box 202.

Figure 3:
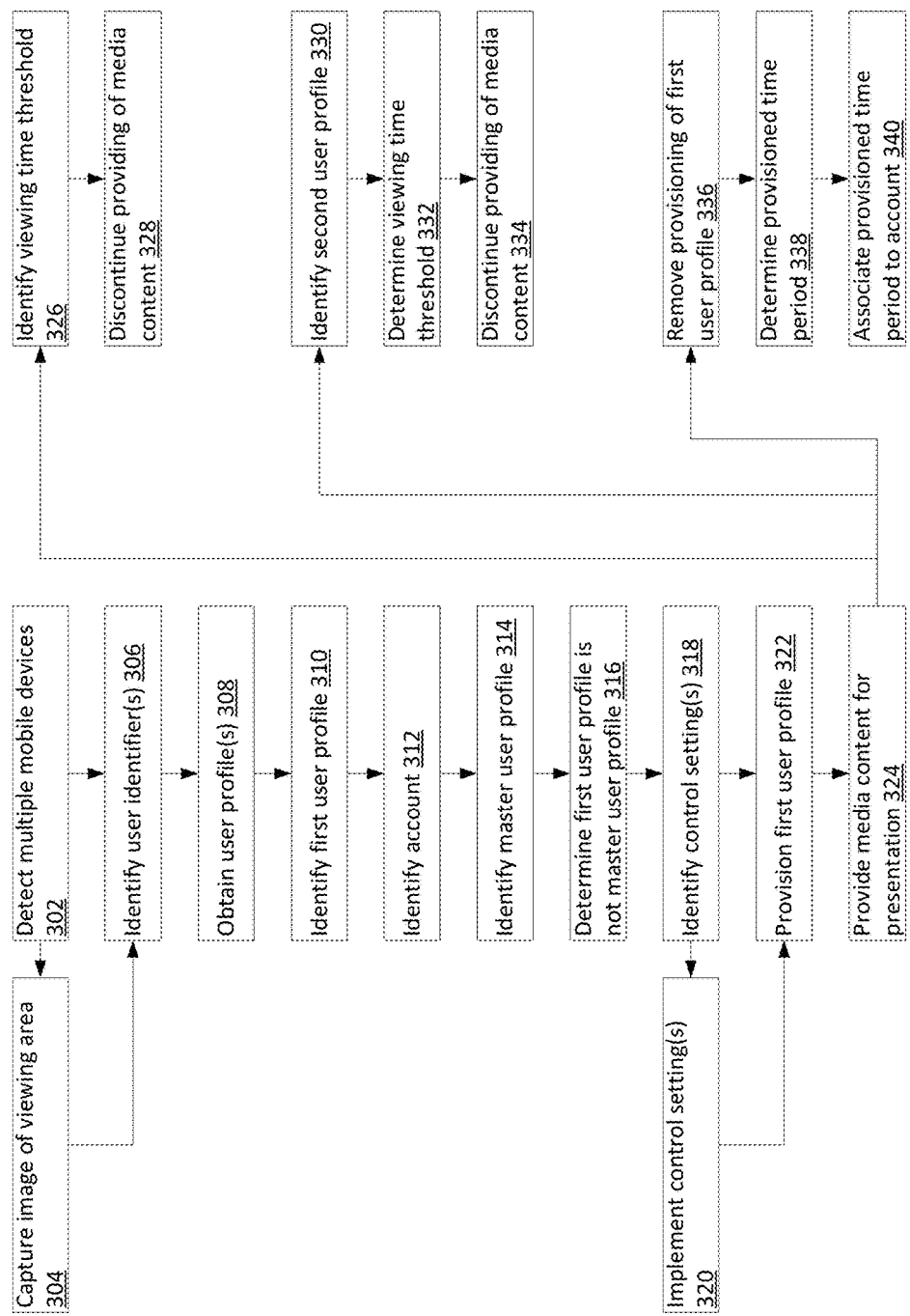
FIGS. 3-4 depicts an illustrative embodiment of a method used in portions of the systems described in FIGS. 1-2 for provisioning a user profile on a media processor.

FIG. 3 depicts an illustrative embodiment of a method 300 used by systems 100, 200 for provisioning a user profile on a media processor or set top box. At a step 302, the method 300 can include a device (e.g. set top box, media processor, media management server, network device, etc.) detecting multiple mobile devices over a communication network in proximity to the set top box. In some embodiments, at a step 304, the method 300 can include a camera communicatively coupled to the device capturing an image of a viewing area for a display. The display can be a television or other presentation device. Further, the device can identifying multiple users within the viewing area and/or the users associated with the detected mobile devices. At a step 306, the method 300 can include the device identifying a user identifier associated with each of the multiple users. These users can be within the viewing area and/or users associated with the detected mobile devices. At a step 308, the method 300 can include obtaining a user profile associated with each of the multiple user identifiers. Further, at a step 310, the method 300 can include the device identifying a first user profile having a first priority or highest priority among the plurality of user profiles.

In other embodiments, at a step 312, the method 300 can include the device identifying, an account associated with the first user profile. Further, at a step 314, the method 300 can include the device identifying a master user profile associated with the account. In addition, at a step 316, the method 300 can include the device determining that the first user profile is not the master user profile. Also, at a step 318, the method 300 can include the device identifying multiple control settings associated with or configured by the master user profile to be used when providing media content associated with the first user profile. In other embodiments, at a step 320, the method 300 can include the device implementing the multiple control settings.

At a step 322, the method 300 can include the device provisioning the first user profile on the set top box. Further, at a step 324, the method 300 can include providing media content for presentation on the display according to the first user profile, and the multiple control setting, if applicable.

In further embodiments, at a step 326, the method 300 can include the device identifying a viewing time threshold for provisioning the first user profile on the device. Additionally, at step 328, the method 300 can include discontinuing the providing of the media content to the display responsive to determining that the first user profile is provisioned on the set top box for a period of time above the viewing time threshold. For example, the first user profile can be a user profile associated with a child. A parent user having a master profile con configure the first user profile with a viewing time threshold of thirty minutes because the parent user would like to limit the time the child user watches media content programs to only thirty minutes at a time. Thus, after first user profile has been provisioned and media content has been provided for thirty minutes, the set top box discontinues providing of the media content. The set top box can provide a notification to be presented on the display communicative coupled to the set top box or to the mobile device of the child user indicating the viewing time threshold has been reached. In some embodiments, the configuration of the viewing time threshold by the parent user with the master profile can be part of the control settings configured for the first user profile. In other embodiments, configuration of the viewing time threshold can be separate from the control settings.

In additional embodiments, at a step 330, the method 300 can include the device identifying a second user profile associated with the account. Further, at step 332, the method 300 can include a device determining a viewing time threshold associated with an amount of time the second user profile was used to view a plurality of media content. Also, at a step 334, the method 300 can include the device discontinuing the providing of the media content to the display responsive to determining that the first user profile is provisioned on the device for a period of time above the viewing time threshold. For example, the first user profile can be associated with a first child and the second user profile can be associated with the second child. A parent user with a master profile can configure that each child can watch equal amounts of media content within a time period (e.g. 24 hour time period). The set top boxes within the household and/or the media content management server can communicate with each other to determine that the user associated with the second user profile has viewed 120 minutes of media content within the time period. Further, set top boxes and/or media content management server can determine user associated with the first user profile has viewed 90 minutes of media content within the time period. Thus, the set top box or media content management server determines a viewing time threshold of 30 minutes for the first user profile when it is provisioned on the set top box. Once the 30 minutes has elapsed, the set top box discontinues providing media content to the display. In some embodiments, the configuration of the amount of viewing time for each of the first user profile and the second profile by the parent user with the master profile can be part of the control settings configured for the first user profile and second user profile. In other embodiments, configuration of the amount of viewing time for each user profile can be separate from the control settings.

In some embodiments, at a step 336, the method 300 can include the device removing the provisioning of the first user profile from the device. Further, at a step 338, the method 300 can include the device determining an amount of time for first user profile was provisioned on the device. In addition, at a step 340, the method 300 can include a device associating the amount of time for the first user profile was provisioned to the account. In some embodiments, the set top box can store the types or names of the media content programs provided when the first user profile was provisioned. For example, a parent user may want to track the amount of time a child user views media content or the types of media content programs viewed. Further, the parent user can have a master profile to configure tracking the amount of time or the types of media content viewed by the user of the first user profile. Thus, after the first user profile is removed from the set top box, the set top box stores the types and names of the media content programs provided when the first user profile was provisioned.

Figure 4:
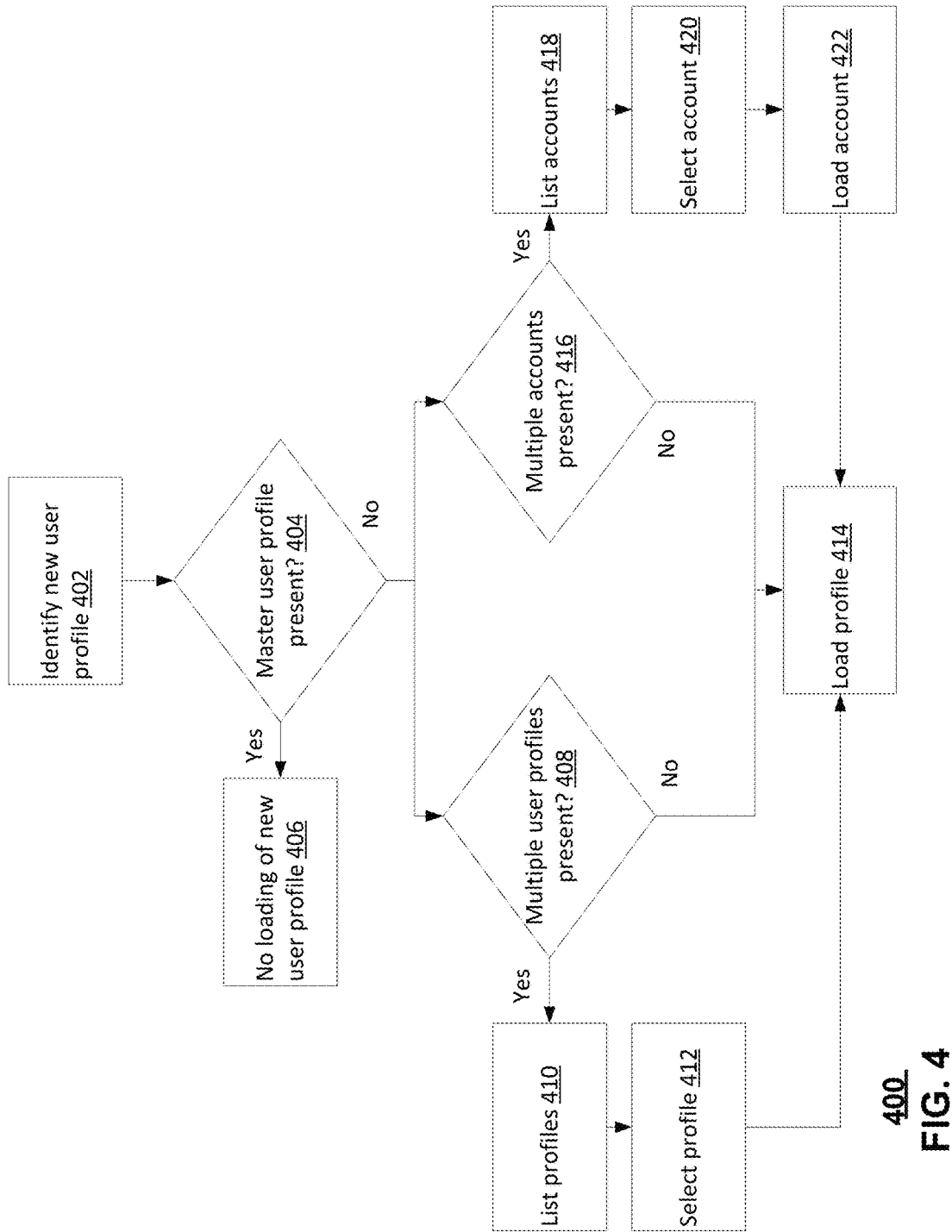

FIG. 4 depicts an illustrative embodiment of a method 400 used by systems 100, 200 for provisioning a user profile on a media processor or set top box. At a step 402, the method 400 can include a device (e.g. set top box, media processor, media management server, network device, etc.) identifying a new user profile. The new user profile may have been obtained from detecting a mobile device for a user associated with the new user profile. Further, at a step 404, the method 400 can include the device determining whether a mobile device associated with the master user profile is presently loaded or provisioned in the set top box. If so, at a step 406, the method 400 can include the device not loading or provisioning the new user profile onto the set top box.

If not, in some embodiments, at a step 408, the method 400 can include a device determining whether multiple user profiles are present or in proximity to the set top box. If not, at step 414, the device loads or otherwise provisions the new user profile on the set top box. If so, at a step 410, the method 400 can include the device listing the multiple user profiles on a user interface. The user interface can be displayed on a television or a mobile device communicative coupled to the device and/or set top box. Further, at a step 412, the method 400 can include a user selecting a user profile from the list of user profiles using an input device. The input device can be a remote control for a television or an input device (e.g. touchscreen) of the mobile device. After a user profile is selected, at a step 414, the method 400 can include the device loading or provisioning the selected user profile onto the set top box.

In other embodiments, if a master user profile is not presently loaded or provisioned on the set top box, at step 416, the method 400 can include the device determining whether multiple accounts are present. If not, at step 414, the device loads or otherwise provisions the new user profile on the set top box. If so, at a step 418, the method 400 can include the device listing the multiple accounts on a user interface. The user interface can be displayed on a television or a mobile device communicative coupled to the device and/or set top box. Further, at a step 420, the method 400 can include a user selecting an account from the list of accounts using an input device. In addition, at a step 422, the device can load the selected account or account information onto the set top box. After the account is loaded, at a step 414, the method 400 can include the device loading or provisioning a user profile associated with the selected account onto the set top box.

While for purposes of simplicity of explanation, the respective processes are shown and described as a series of blocks in FIGS. 3-4, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 5:
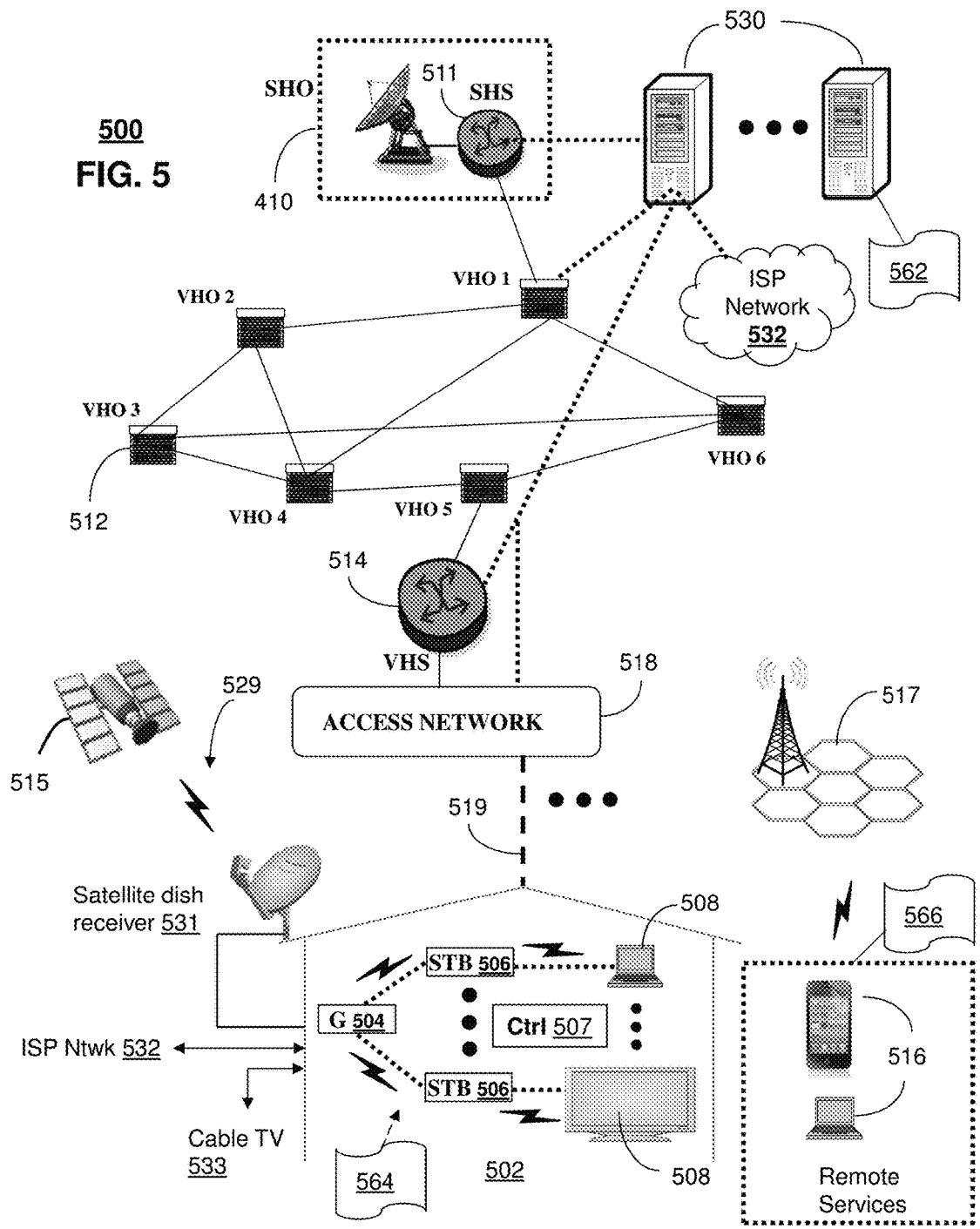
FIGS. 5-6 depict illustrative embodiments of communication systems that provide media services and management of the media services.

FIG. 5 depicts an illustrative embodiment of a first communication system 400 for delivering media content. The communication system 500 can represent an Internet Protocol Television (IPTV) media system. Communication system 500 can be overlaid or operably coupled with systems 100, 200 of FIGS. 1 and/or 2 as another representative embodiment of communication system 500. For instance, one or more devices illustrated in the communication system 500 of FIG. 5 can detect multiple mobile devices over a communication network in proximity to a set top box. Further, the one or more devices can identify a user identifier associated with each of the multiple mobile devices resulting in multiple user identifiers. In addition, the one or more mobile devices can obtain a user profile associated with each of the multiple user identifiers resulting in multiple user profiles. Also, the one or more devices can identify a first user profile having a first priority among the multiple user profiles. Further, the one or more devices can provision the first user profile on set top box and provide media content for presentation on a display according to the first user profile.

The IPTV media system can include a super head-end office (SHO) 510 with at least one super headend office server (SHS) 511 which receives media content from satellite and/or terrestrial communication systems. In the present context, media content can represent, for example, audio content, moving image content such as 2D or 3D videos, video games, virtual reality content, still image content, and combinations thereof. The SHS server 511 can forward packets associated with the media content to one or more video head-end servers (VHS) 514 via a network of video head-end offices (VHO) 512 according to a multicast communication protocol.

The VHS 514 can distribute multimedia broadcast content via an access network 518 to commercial and/or residential buildings 502 housing a gateway 504 (such as a residential or commercial gateway). The access network 518 can represent a group of digital subscriber line access multiplexers (DSLAMs) located in a central office or a service area interface that provide broadband services over fiber optical links or copper twisted pairs 519 to buildings 502. The gateway 504 can use communication technology to distribute broadcast signals to media processors 506 such as Set-Top Boxes (STBs) which in turn present broadcast channels to media devices 508 such as computers or television sets managed in some instances by a media controller 507 (such as an infrared or RF remote controller).

The gateway 504, the media processors 506, and media devices 508 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 529 can be used in the media system of FIG. 5. The satellite broadcast television system can be overlaid, operably coupled with, or replace the IPTV system as another representative embodiment of communication system 500. In this embodiment, signals transmitted by a satellite 515 that include media content can be received by a satellite dish receiver 531 coupled to the building 502. Modulated signals received by the satellite dish receiver 531 can be transferred to the media processors 406 for demodulating, decoding, encoding, and/or distributing broadcast channels to the media devices 508. The media processors 506 can be equipped with a broadband port to an Internet Service Provider (ISP) network 532 to enable interactive services such as VoD and EPG as described above.

In yet another embodiment, an analog or digital cable broadcast distribution system such as cable TV system 533 can be overlaid, operably coupled with, or replace the IPTV system and/or the satellite TV system as another representative embodiment of communication system 500. In this embodiment, the cable TV system 533 can also provide Internet, telephony, and interactive media services. System 500 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 530, a portion of which can operate as a web server for providing web portal services over the ISP network 532 to wireline media devices 508 or wireless communication devices 516.

Communication system 500 can also provide for all or a portion of the computing devices 530 to function as a media management server (herein referred to as media content management server 530). The media content management server 530 can use computing and communication technology to perform function 562, which can include among other things, implements a portion of techniques described by methods 300, 400 of FIGS. 3-4. For instance, function 562 of server 530 can be similar to the functions described for server 102 of FIGS. 1-2 in accordance with methods 300, 400. The media processors 506 and wireless communication devices 516 can be provisioned with software functions 562 and 564, respectively, to utilize the services of media content management server 530. For instance, functions 562 and 564 of media processors 506 and wireless communication devices 516 can be similar to the functions described for the communication devices 116, 132, 142, 152 and 126, 130, 140, 150, 160 of FIG. 1 in accordance with methods 300, 400.

Multiple forms of media services can be offered to media devices over landline technologies such as those described above. Additionally, media services can be offered to media devices by way of a wireless access base station 517 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 6:
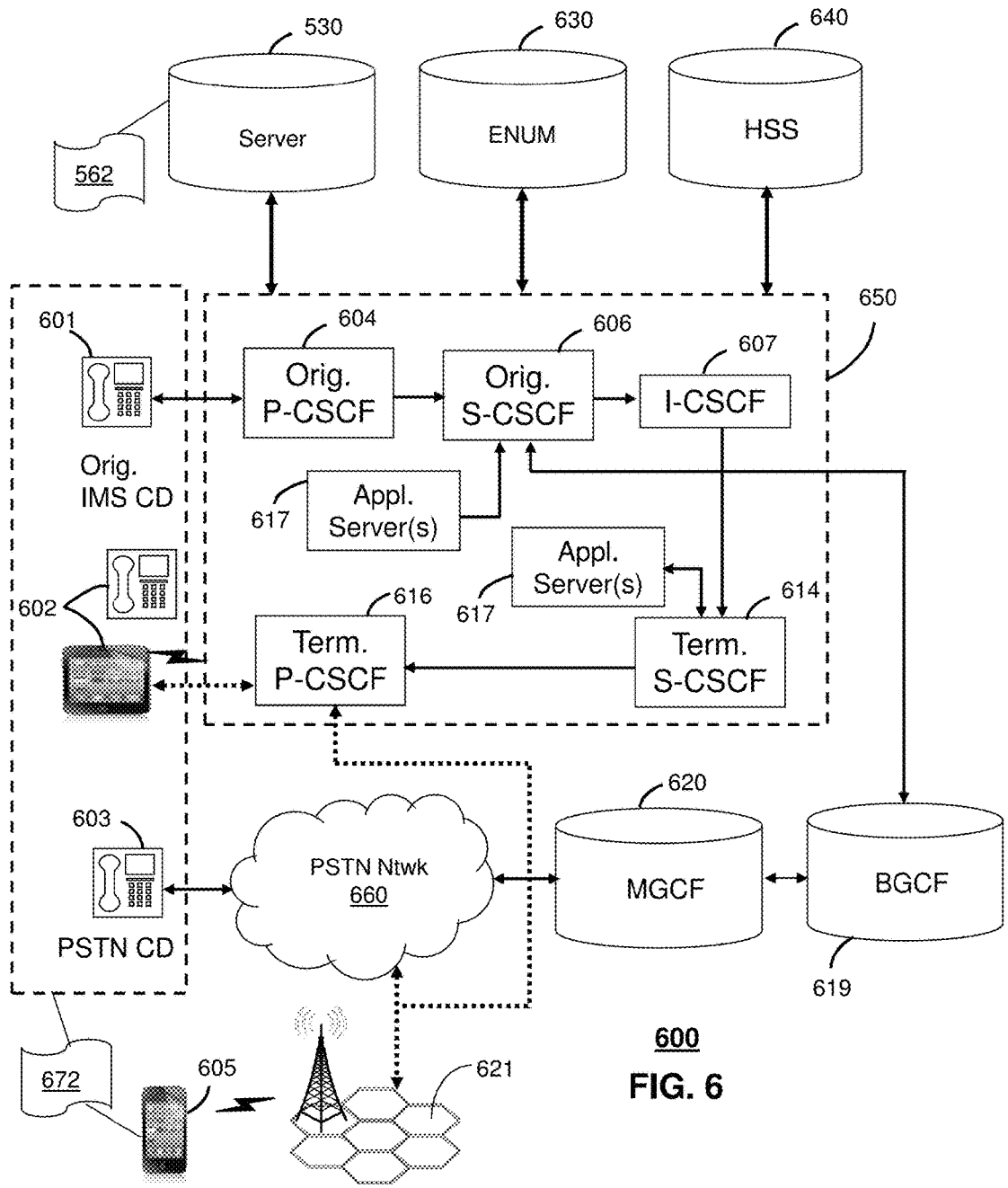

FIG. 6 depicts an illustrative embodiment of a communication system 600 employing an IP Multimedia Subsystem (IMS) network architecture to facilitate the combined services of circuit-switched and packet-switched systems. Communication system 600 can be overlaid or operably coupled with systems 100, 200 of FIGS. 1 and/or 2 and communication system 500 as another representative embodiment of communication system 500. For instance, one or more devices illustrated in the communication system 600 of FIG. 6 can detect multiple mobile devices over a communication network. Further, the one or more devices can identify a user identifier associated with each of the multiple mobile devices resulting in multiple user identifiers. In addition, the one or more mobile devices can obtain a user profile associated with each of the multiple user identifiers resulting in multiple user profiles. Also, the one or more devices can identify a first user profile having a first priority among the multiple user profiles. Further, the one or more devices can provision the first user profile on set top box and provide media content for presentation on a display according to the first user profile.

Communication system 600 can comprise a Home Subscriber Server (HSS) 640, a tElephone NUmber Mapping (ENUM) server 630, and other network elements of an IMS network 650. The IMS network 650 can establish communications between IMS-compliant communication devices (CDs) 601, 602, Public Switched Telephone Network (PSTN) CDs 603, 605, and combinations thereof by way of a Media Gateway Control Function (MGCF) 620 coupled to a PSTN network 660. The MGCF 620 need not be used when a communication session involves IMS CD to IMS CD communications. A communication session involving at least one PSTN CD may utilize the MGCF 620.

IMS CDs 601, 602 can register with the IMS network 650 by contacting a Proxy Call Session Control Function (P-CSCF) which communicates with an interrogating CSCF (I-CSCF), which in turn, communicates with a Serving CSCF (S-CSCF) to register the CDs with the HSS 640. To initiate a communication session between CDs, an originating IMS CD 601 can submit a Session Initiation Protocol (SIP INVITE) message to an originating P-CSCF 604 which communicates with a corresponding originating S-CSCF 606. The originating S-CSCF 606 can submit the SIP INVITE message to one or more application servers (ASs) 617 that can provide a variety of services to IMS subscribers.

For example, the application servers 617 can be used to perform originating call feature treatment functions on the calling party number received by the originating S-CSCF 606 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 630 to translate an E.164 telephone number in the SIP INVITE message to a SIP Uniform Resource Identifier (URI) if the terminating communication device is IMS-compliant. The SIP URI can be used by an Interrogating CSCF (I-CSCF) 607 to submit a query to the HSS 640 to identify a terminating S-CSCF 614 associated with a terminating IMS CD such as reference 602. Once identified, the I-CSCF 607 can submit the SIP INVITE message to the terminating S-CSCF 614. The terminating S-CSCF 614 can then identify a terminating P-CSCF 616 associated with the terminating CD 602. The P-CSCF 616 may then signal the CD 602 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 6 may be interchangeable. It is further noted that communication system 600 can be adapted to support video conferencing. In addition, communication system 600 can be adapted to provide the IMS CDs 601, 602 with the multimedia and Internet services of communication system 500 of FIG. 5.

If the terminating communication device is instead a PSTN CD such as CD 603 or CD 605 (in instances where the cellular phone only supports circuit-switched voice communications), the ENUM system 630 can respond with an unsuccessful address resolution which can cause the originating S-CSCF 606 to forward the call to the MGCF 620 via a Breakout Gateway Control Function (BGCF) 619. The MGCF 620 can then initiate the call to the terminating PSTN CD over the PSTN network 660 to enable the calling and called parties to engage in voice and/or data communications.

It is further appreciated that the CDs of FIG. 6 can operate as wireline or wireless devices. For example, the CDs of FIG. 6 can be communicatively coupled to a cellular base station 621, a femtocell, a WiFi router, a Digital Enhanced Cordless Telecommunications (DECT) base unit, or another suitable wireless access unit to establish communications with the IMS network 650 of FIG. 6. The cellular access base station 621 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 6.

Cellular phones supporting LTE can support packet-switched voice and packet-switched data communications and thus may operate as IMS-compliant mobile devices. In this embodiment, the cellular base station 621 may communicate directly with the IMS network 650 as shown by the arrow connecting the cellular base station 621 and the P-CSCF 616.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The media content management server 530 of FIG. 5 can be operably coupled to communication system 600 for purposes similar to those described above. Media content management server 530 can perform function 562 and thereby provide media content management services such as managing user profiles to be loaded on media processors from the CDs 601, 602, 603 and 605 of FIG. 6 similar to the functions described for server 102 of FIGS. 1-2 in accordance with methods 300, 400 of FIGS. 3-4. CDs 601, 602, 603 and 605, which can be adapted with software to perform function 672 to utilize the media content management services of the media content management server 530 similar to the functions described for communication devices 126, 130, 140, 150, 160 of FIG. 1 in accordance with methods 300, 400 of FIGS. 3-4.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as 3rd Generation Partnership Project (3GPP). It is further noted that some or all embodiments of the subject disclosure may in whole or in part modify, supplement, or otherwise supersede final or proposed standards published and promulgated by 3GPP.

Figure 7:
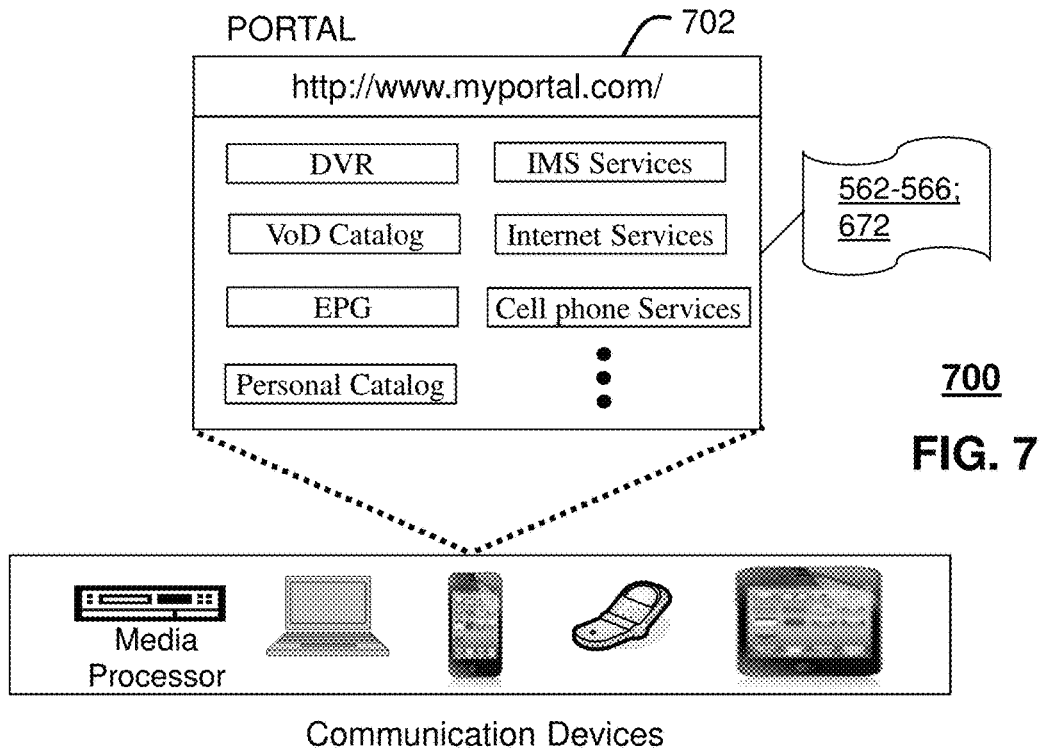
FIG. 7 depicts an illustrative embodiment of a web portal for interacting with the communication systems that manage media services.

FIG. 7 depicts an illustrative embodiment of a web portal 702 of a communication system 700. Communication system 700 can be overlaid or operably coupled with systems 100, 200 of FIGS. 1 and/or 2, communication system 500, and/or communication system 600 as another representative embodiment of systems 100, 200 of FIGS. 1 and/or 2, communication system 500, and/or communication system 600. The web portal 702 can be used for managing or registering for media content management services of systems 100, 200 of FIGS. 1 and/or 2 and communication systems 500-600. A web page of the web portal 702 can be accessed by a Uniform Resource Locator (URL) with an Internet browser using an Internet-capable communication device such as those described in FIGS. 1 and/or 2 and FIGS. 5-6. The web portal 702 can be configured, for example, to access a media processor 506 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 506. The web portal 702 can also be used for provisioning IMS services described earlier, provisioning Internet services, provisioning cellular phone services, and so on.

The web portal 702 can further be utilized to manage and provision software applications 562-564, and 672 to adapt these applications as may be desired by subscribers and/or service providers of systems 100, 200 of FIGS. 1 and/or 2, and communication systems 500-600. For instance, users of the media content management services provided by server 102 or server 530 can log into their on-line accounts and provision the servers 102 or server 530 with and register mobile devices and associate them with user profiles. This can include the server obtaining a device identifier for the mobile device and associating the device identifier with a user identifier and/or user profile. Further, the users can manage their user profiles through portal 702. For example, a user can manage the parental control settings associated with a user profile, configure viewing time thresholds for certain user profiles associated with the account, edit the criteria to provide recommended media content programs, etc. Service providers can log onto an administrator account to provision, monitor and/or maintain the systems 100, 200 of FIGS. 1 and/or 2 or server 530.

Figure 8:
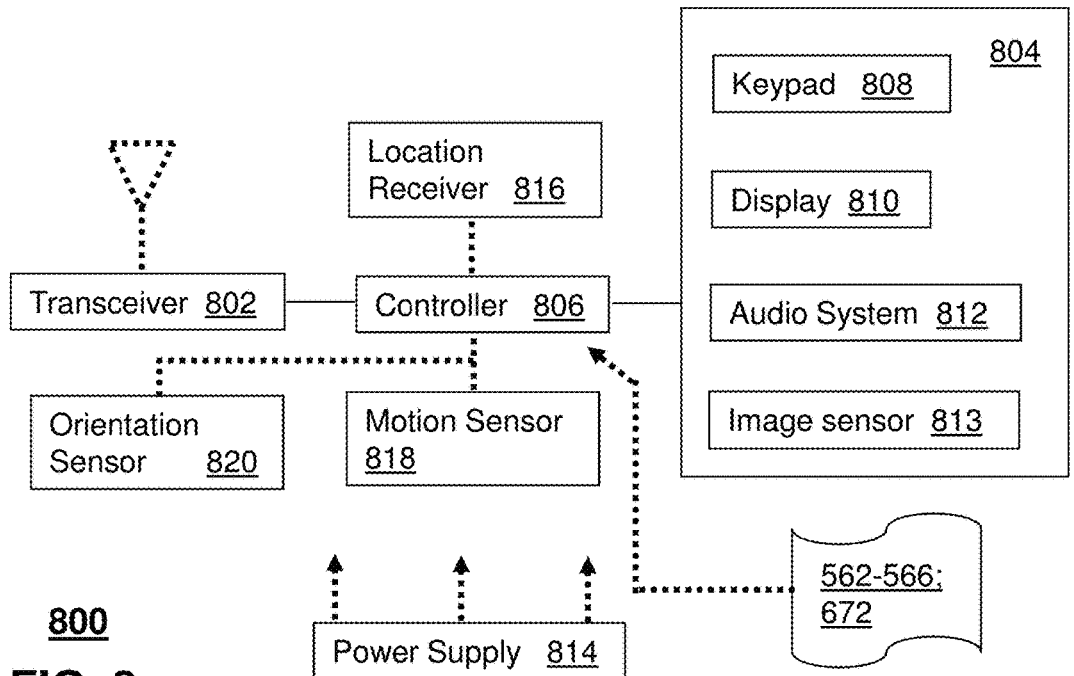
FIG. 8 depicts an illustrative embodiment of a communication device.

FIG. 8 depicts an illustrative embodiment of a communication device 800. Communication device 800 can serve in whole or in part as an illustrative embodiment of the devices depicted in FIGS. 1 and/or 2, and FIGS. 5-6 and can be configured to perform portions of methods 300, 400 of FIGS. 3-4.

Communication device 800 can comprise a wireline and/or wireless transceiver 802 (herein transceiver 802), a user interface (UI) 804, a power supply 814, a location receiver 816, a motion sensor 818, an orientation sensor 820, and a controller 806 for managing operations thereof. The transceiver 802 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 802 can also be adapted to support circuit-switched wireline access technologies (such as PSTN), packet-switched wireline access technologies (such as TCP/IP, VoIP, etc.), and combinations thereof.

The UI 804 can include a depressible or touch-sensitive keypad 808 with a navigation mechanism such as a roller ball, a joystick, a mouse, or a navigation disk for manipulating operations of the communication device 800. The keypad 808 can be an integral part of a housing assembly of the communication device 800 or an independent device operably coupled thereto by a tethered wireline interface (such as a USB cable) or a wireless interface supporting for example Bluetooth®. The keypad 808 can represent a numeric keypad commonly used by phones, and/or a QWERTY keypad with alphanumeric keys. The UI 704 can further include a display 810 such as monochrome or color LCD (Liquid Crystal Display), OLED (Organic Light Emitting Diode) or other suitable display technology for conveying images to an end user of the communication device 800. In an embodiment where the display 810 is touch-sensitive, a portion or all of the keypad 808 can be presented by way of the display 810 with navigation features.

The display 810 can use touch screen technology to also serve as a user interface for detecting user input. As a touch screen display, the communication device 800 can be adapted to present a user interface with graphical user interface (GUI) elements that can be selected by a user with a touch of a finger. The touch screen display 810 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 810 can be an integral part of the housing assembly of the communication device 800 or an independent device communicatively coupled thereto by a tethered wireline interface (such as a cable) or a wireless interface.

The UI 804 can also include an audio system 812 that utilizes audio technology for conveying low volume audio (such as audio heard in proximity of a human ear) and high volume audio (such as speakerphone for hands free operation). The audio system 812 can further include a microphone for receiving audible signals of an end user. The audio system 812 can also be used for voice recognition applications. The UI 804 can further include an image sensor 813 such as a charged coupled device (CCD) camera for capturing still or moving images.

The power supply 814 can utilize common power management technologies such as replaceable and rechargeable batteries, supply regulation technologies, and/or charging system technologies for supplying energy to the components of the communication device 800 to facilitate long-range or short-range portable applications. Alternatively, or in combination, the charging system can utilize external power sources such as DC power supplied over a physical interface such as a USB port or other suitable tethering technologies.

The location receiver 816 can utilize location technology such as a global positioning system (GPS) receiver capable of assisted GPS for identifying a location of the communication device 800 based on signals generated by a constellation of GPS satellites, which can be used for facilitating location services such as navigation. The motion sensor 818 can utilize motion sensing technology such as an accelerometer, a gyroscope, or other suitable motion sensing technology to detect motion of the communication device 800 in three-dimensional space. The orientation sensor 820 can utilize orientation sensing technology such as a magnetometer to detect the orientation of the communication device 800 (north, south, west, and east, as well as combined orientations in degrees, minutes, or other suitable orientation metrics).

The communication device 800 can use the transceiver 802 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 806 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 800.

Other components not shown in FIG. 8 can be used in one or more embodiments of the subject disclosure. For instance, the communication device 800 can include a reset button (not shown). The reset button can be used to reset the controller 806 of the communication device 800. In yet another embodiment, the communication device 800 can also include a factory default setting button positioned, for example, below a small hole in a housing assembly of the communication device 800 to force the communication device 800 to re-establish factory settings. In this embodiment, a user can use a protruding object such as a pen or paper clip tip to reach into the hole and depress the default setting button. The communication device 800 can also include a slot for adding or removing an identity module such as a Subscriber Identity Module (SIM) card. SIM cards can be used for identifying subscriber services, executing programs, storing subscriber data, and so forth.

The communication device 800 as described herein can operate with more or less of the circuit components shown in FIG. 8. These variant embodiments can be used in one or more embodiments of the subject disclosure.

The communication device 800 can be adapted to perform the functions of mobile devices 126, 130, 140, 150, 160, 204, 214, set top boxes 116, 132, 142, 152, 202, media devices 118, 134, 144, 154, 208 of FIGS. 1 and/or 2, the media processor 506, the media devices 508, or the portable communication devices 516 of FIG. 5, as well as the IMS CDs 601-602 and PSTN CDs 603-605 of FIG. 6. It will be appreciated that the communication device 800 can also represent other devices that can operate in systems 100, 200 of FIGS. 1 and/or 2, communication systems 500-600 of FIGS. 5-6 such as a gaming console and a media player. In addition, the controller 806 can be adapted in various embodiments to perform the functions 562-564 and 672, respectively.

Upon reviewing the aforementioned embodiments, it would be evident to an artisan with ordinary skill in the art that said embodiments can be modified, reduced, or enhanced without departing from the scope of the claims described below. For example, portions or all of some embodiments can be combined with portions or all of other embodiments. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 9:
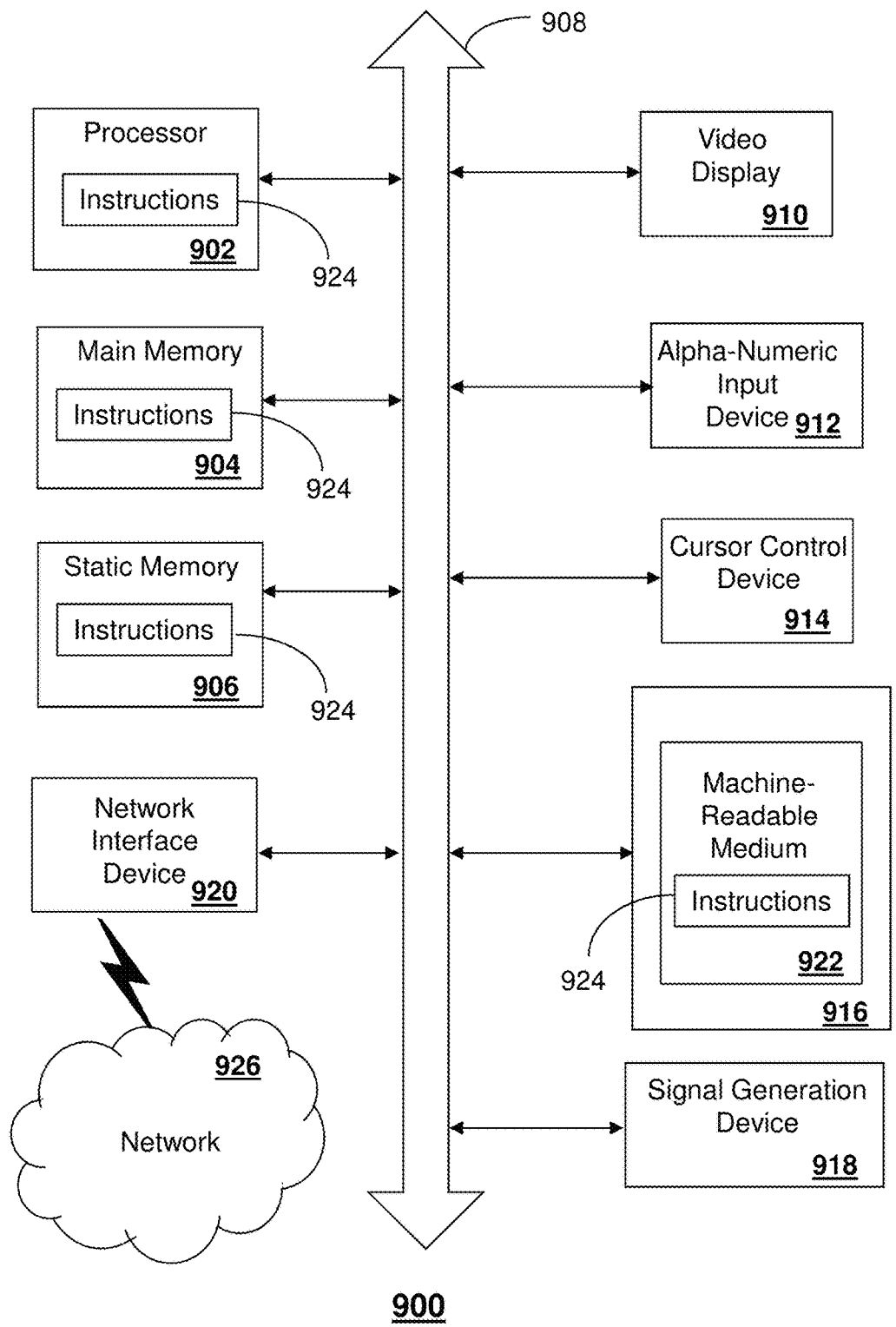
FIG. 9 is a diagrammatic representation of a machine in the form of a computer system within which a set of instructions, when executed, may cause the machine to perform any one or more of the methods described herein.

FIG. 9 depicts an exemplary diagrammatic representation of a machine in the form of a computer system 900 within which a set of instructions, when executed, may cause the machine to perform any one or more of the methods described above. One or more instances of the machine can operate, for example, as the media content management server 530, the media processor 506, mobile devices 126, 130, 140, 150, 160, 204, 214, set top boxes 116, 132, 142, 152, 202, media devices 118, 134, 144, 154, 208 of FIGS. 1 and/or 2, the media processor 506, the media devices 508, or the portable communication devices 516 and other devices of FIGS. 1-8. In some embodiments, the machine may be connected (e.g., using a network 926) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 900 may include a processor (or controller) 902 (e.g., a central processing unit (CPU)), a graphics processing unit (GPU, or both), a main memory 904 and a static memory 906, which communicate with each other via a bus 908. The computer system 900 may further include a display unit 910 (e.g., a liquid crystal display (LCD), a flat panel, or a solid state display). The computer system 900 may include an input device 912 (e.g., a keyboard), a cursor control device 914 (e.g., a mouse), a disk drive unit 916, a signal generation device 918 (e.g., a speaker or remote control) and a network interface device 920. In distributed environments, the embodiments described in the subject disclosure can be adapted to utilize multiple display units 910 controlled by two or more computer systems 900. In this configuration, presentations described by the subject disclosure may in part be shown in a first of the display units 910, while the remaining portion is presented in a second of the display units 910.

The disk drive unit 916 may include a tangible computer-readable storage medium 922 on which is stored one or more sets of instructions (e.g., software 924) embodying any one or more of the methods or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 922 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 800. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
   a processing system including a processor; and
   a memory that stores executable instructions that, when executed by the processing system, facilitate performance of operations, comprising:
   detecting a plurality of mobile devices in proximity to the device;
   identifying a user identifier associated with each of the plurality of mobile devices resulting in a plurality of user identifiers;
   obtaining a user profile associated with each of the plurality of user identifiers resulting in a plurality of user profiles;
   determining that a portion of the plurality of user profiles is associated with a premises associated with the device;
   identifying a first user profile of the plurality of user profiles is not associated with the device and not associated with the premises;
   determining that a user associated with the first user profile is a subscriber to a service provider associated with the device;
   provisioning the first user profile on the device;
   providing media content for presentation on a display according to the first user profile;
   identifying a master user profile associated with an account and the first user profile;
   determining that the first user profile is not the master user profile;
   identifying a type of media content;
   recording the type of media content to the master user profile;
   providing a notification to a communication device associated with the master user profile, wherein the notification includes a listing of the media content; and
   providing the media content to the communication device for presentation in response to receiving user-generated input.

2. The device of claim 1, wherein the detecting of the plurality of mobile devices further comprises detecting the plurality of mobile device across one of a peer-to-peer communication link and a wireless communication network.

3. The device of claim 1, wherein the operations further comprise:
   capturing an image of a viewing area for the display;
   identifying a plurality of users within the viewing area; and
   associating a viewing user profile for each of the plurality of users within the viewing area resulting in a plurality of viewing user profiles.

4. The device of claim 1, wherein the operations further comprise identifying the account is associated with the first user profile.

5. The device of claim 4, wherein the operations further comprise:
   identifying a plurality of control settings associated with the master user profile for the providing of the media content associated with the first user profile; and
   wherein the providing of the media content further comprising implementing the plurality of control settings, wherein the master user profile has a priority that is higher than a first priority of the first user profile, and wherein the implementing of the plurality of control settings is according to the master user profile having a higher priority than the first priority of the first user profile.

6. The device of claim 4, wherein the operations further comprise:
   identifying a viewing time threshold for provisioning the first user profile on the device; and discontinuing the providing of the media content to the display responsive to determining that the first user profile is provisioned on the device for a period of time above the viewing time threshold.

7. The device of claim 4, wherein the operations further comprise:
identifying a second user profile associated with the account;
determining a viewing time threshold associated with an amount of time the second user profile was used to view a plurality of media content; and
discontinuing the providing of the media content to the display responsive to determining that the first user profile is provisioned on the device for a period of time above the viewing time threshold.

8. The device of claim 4, wherein the operation further comprise:
removing the provisioning of the first user profile from the device;
determining an amount of time for first user profile was provisioned on the device; and
associating the amount of time for the first user profile was provisioned to the account.

9. A non-transitory machine-readable storage medium, comprising executable instructions that, when executed by a processing system including a processor, facilitate performance of operations, comprising:
detecting a plurality of mobile devices in proximity to the processing system;
capturing an image of a viewing area for a display;
identifying a plurality of users within the viewing area;
identifying a user identifier associated with each of the plurality of users within the viewing area resulting in a plurality of user identifiers;
obtaining a user profile associated with each of the plurality of user identifiers resulting in a plurality of user profiles;
determining that a portion of the plurality of user profiles is associated with a premises associated with the processing system;
identifying a first user profile of the plurality of user profiles is not associated with the processing system and not associated with the premises;
determining that a user associated with the first user profile is a subscriber to a service provider associated with the processing system;
provisioning the first user profile on the processing system;
providing media content for presentation on the display according to the first user profile;
identifying a master user profile associated with an account;
determining that the first user profile is not the master user profile;
identifying a type of the media content;
recording the type of media content to the master user profile;
providing a notification to a communication device associated with the master user profile, wherein the notification includes a listing of the media content; and
providing the media content to the communication device for presentation in response to receiving user-generated input.

10. The non-transitory machine-readable storage medium of claim 9, wherein the detecting of the plurality of mobile devices further comprises detecting the plurality of mobile device across one of a peer-to-peer communication link and a wireless communication network.

11. The non-transitory machine-readable storage medium of claim 9, wherein the operations further comprise identifying the account is associated with the first user profile.

12. The non-transitory machine-readable storage medium of claim 11, wherein the operations further comprise:
identifying a plurality of control settings associated with the master user profile for the providing of the media content associated with the first user profile; and
wherein the providing of the media content further comprising implementing the plurality of control settings.

13. The non-transitory machine-readable storage medium of claim 11, wherein the operations further comprise:
identifying a viewing time threshold for provisioning the first user profile on the processing system; and
discontinuing the providing of the media content to the display responsive to determining that the first user profile is provisioned on the processing system a period of time above the viewing time threshold.

14. The non-transitory machine-readable storage medium of claim 11, wherein the operations further comprise:
identifying a second user profile associated with the account;
determining a viewing time threshold associated with an amount of time the second user profile was used to view a plurality of media content; and
discontinuing the providing of the media content to the display responsive to determining that the first user profile is provisioned on the processing system a period of time above the viewing time threshold.

15. The non-transitory machine-readable storage medium of claim 11, wherein the operations further comprise:
removing the provisioning of the first user profile from the processing system;
determining an amount of time for first user profile was provisioned on the processing system; and
associating the amount of time for the first user profile was provisioned to the account.

16. A method, comprising:
detecting, by a processing system including a processor, a plurality of mobile devices in proximity to the processing system;
identifying, by the processing system, a user identifier associated with each of the plurality of mobile devices resulting in a plurality of user identifiers;
obtaining, by the processing system, a user profile associated with each of the plurality of user identifiers resulting in a plurality of user profiles;
determining, by the processing system, that a portion of the plurality of user profiles is associated with a premises associated with the processing system;
identifying, by the processing system, a first user profile of the plurality of user profiles is not associated with the processing system and not associated with the premises;
determining, by the processing system, that a user associated with the first user profile is a subscriber to a service provider associated with the processing system;
identifying, by the processing system, an account associated with the first user profile;
provisioning, by the processing system, the first user profile on the processing system;
identifying, by the processing system, a master user profile associated with the account;
determining, by the processing system, that the first user profile is not the master user profile;

identifying, by the processing system, a plurality of control settings associated with the master user profile to be used when providing media content associated with the first user profile;

providing, by the processing system, media content to be presented on a display according to the first user profile and the plurality of control settings;

identifying, by the processing system, a type of media content;

recording, by the processing system, the type of media content to the master user profile;

providing, by the processing system, a notification to a communication device associated with the master user profile, wherein the notification includes a listing of the media content; and providing, by the processing system, the media content to the communication device for presentation in response to receiving user-generated input.

17. The method of claim 16, wherein the detecting of the plurality of mobile devices further comprises detecting the plurality of mobile device across one of a peer-to-peer communication link and a wireless communication network.

18. The method of claim 16, further comprising:
capturing, by the processing system, an image of a viewing area for the display;
identifying, by the processing system, a plurality of users within the viewing area; and
associating, by the processing system, a viewing user profile for each of the plurality of users within the viewing area resulting in a plurality of viewing user profiles.

19. The method of claim 16, further comprising:
identifying, by the processing system, a viewing time threshold for provisioning the first user profile on the processing system; and
discontinuing, by the processing system, the providing of the media content to the display responsive to determining, by the processing system, that the first user profile is provisioned on the processing system a period of time above the viewing time threshold.

20. The method of claim 16, further comprising:
identifying, by the processing system, a second user profile associated with the account;
determining, by the processing system, a viewing time threshold associated with an amount of time the second user profile was used to view a plurality of media content; and
discontinuing, by the processing system, the providing of the media content to the display responsive to determining, by the processing system, that the first user profile is provisioned on the processing system a period of time above the viewing time threshold.

* * * * *